United States Patent Office
3,651,108
Patented Mar. 21, 1972

3,651,108
PROCESS FOR THE PREPARATION OF
TIN-ALKYLS
Bindo Massimo Giannaccari, Rome, and Riccardo Galli,
Novara, Italy, assignors to Montecatini Edison S.p.A.,
Milan, Italy
No Drawing. Filed May 14, 1970, Ser. No. 37,287
Claims priority, application Italy, May 20, 1969,
17,020/69
Int. Cl. C07f 7/22
U.S. Cl. 260—429.7                                    11 Claims

ABSTRACT OF THE DISCLOSURE

A process is disclosed for preparing tin-alkyls starting from metallic tin and alkyl halides, characterized in that a mixture of subdivided tin and an auxiliary subdivided alkali or alkaline earth metal is reacted with an alkyl halide in the presence of a catalyst selected from the class consisting of onium salts and Lewis bases or mixtures thereof, at a temperature between 0 and 150° C. The onium salts are tetra-alkylammonium halides and the Lewis bases are ethers, thioethers and amines.

---

The present invention relates to a process for the preparation of tin-alkyls, and more particularly the preparation of tin-alkyls of the general formula $SnR_4$, wherein R is an alkyl group having from 1 to 8 carbon atoms. These compounds are particularly interesting for their use in marine paints and as stabilizers for polyvinylchloride.

It is already known to prepare tin-alkyls by reacting a tin-tetra-halide and an organometallic compound: for instance tin-tetra-chloride and a Grignard compound:

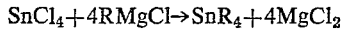

$$SnCl_4 + 4RMgCl \rightarrow SnR_4 + 4MgCl_2$$

Such a process has various drawbacks, however, such as requiring the use of tin salts and expensive organometallic alkylating agents difficult to prepare and handle. A further drawback of such a process is the formation of halogenated by-products such as $SnR_3Cl$ and $SnR_2Cl_2$ which are difficult to separate.

An object of the present invention is that of providing a process for the preparation of tin-alkyls which is free of the drawbacks of the prior art and which is simple, practical and cheap.

According to the process of this invention tin-alkyls may be readily obtained by the direct alkylation of metallic tin with alkyl halides, by reacting a mixture of subdivided tin and an auxiliary subdivided alkali or alkaline earth metal with an alkyl halide, in the presence of a catalyst selected from the group consisting of onium salts and Lewis bases or mixtures thereof, at temperatures between 0° and 150° C.

The alkyl halide has the double function of alkylating agent and reaction medium. The reaction may be schematically represented as follows:

(a) in the presence of alkali metals:

$$Sn + 4M + 4RX \rightarrow SnR_4 + 4MX$$

(b) in the presence of alkaline earth metals:

$$Sn + 2M + 4RX \rightarrow SnR_4 + 2MX_2$$

During the reaction the tin is converted into the desired tin-alkyl, while the auxiliary metal is transformed into its halide.

The reaction takes place at a suitable temperature and a suitable pressure depending on the boiling point of the alkylating agent, and preferably in an inert atmosphere.

The operational temperature may vary from about 0° to 150° C., but preferably the process is carried out at the reflux temperature of the mixture; moreover it is preferred to operate under pressure whenever low-boiling alkylating agents are used.

The process may be carried out either continuously or batchwise.

According to a preferred embodiment of this invention, a suspension of the metal powders (Sn+M) in the alkylating agent is maintained under stirring in the reaction apparatus. The reactants are fed into the reactor together with the catalyst, while from the overflow is taken a part of the solution which is then filtered from the metal residues and from the salts formed. Thereupon, by distillation under vacuum, the volatile components (alkyl halides, volatile catalysts) are recovered, obtaining as a residue the tin-alkyl reaction product which is then purified according to procedures well known per se.

The tin used in the process according to this invention must be in a subdivided form: either powdery or comminuted. The auxiliary alkali or alkaline earth metals (such as for instance Na, K, Mg. Ca) are also employed in subdivided form. Both the tin as well as the auxiliary metal must have a granular size smaller than about 1 mm.; the granulometry influences the reaction speed which rises with decrease in the size of the metal particles.

Of particular importance is the surface condition of the tin employed in the process according to this invention. In order to obtain a satisfactory course of reaction it is therefore preferred to use the powder in a particularly active form. For this purpose it is desirable to effect a pre-washing of the powder itself with solutions of halogens ($Cl_2$, $Br_2$, $I_2$) in inert solvents, such as for instance $CCl_4$.

Another preferred highly reactive form of tin for use in the process is obtained by cementation with electropositive metals (e.g. Mg or Zn) from solutions of tin salts in organic solvents.

It is quite convenient and economical to use alkyl halides (RX) as alkylating agents, where the R is an alkyl group having from 1 to 8 carbon atoms and where X is a halogen selected from the class consisting of Cl, Br and I.

It is also possible to use a mixture of alkyl halides; in this case a tin-alkyl ($SnR_4$) in which the alkyl groups are different is obtained.

In order to achieve good reaction speeds and satisfactory yields, it is necessary to carry out the reaction in the presence of suitable catalysts.

The catalysts used are onium salts and Lewis bases of the ether, thioether and amine type. Particularly effective is the use of mixtures of these two classes of compounds. Examples of onium salts to be used in the process according to this invention are tetra-alkylammonium halides such as: tetra-butylammonium iodide, tetra-butylammonium bromide, tetra-isopentylammonium bromide, tetra-heptylammonium iodide. The ammonium salts in which the alkyl contains at least 4 carbon atoms are preferred, in as much as they are more soluble than the ammonium salts with alkyls having up to and including 3 carbon atoms.

As Lewis base there may be used either aliphatic ethers ($Et_2O$, $Bu_2O$, carbitols) or cyclic ethers (furan, tetrahydrofuran, pyran, tetra-hydropyran, dioxane): also the use of the thioether such as tetra-hydrothiophene, and amines such as $Et_3N$, $C_6H_5$—$NEt_2$ have proved to be suitable for carrying out the process. The cyclic ethers and the polyethers of the formula RO—$CH_2$—$CH_2$—OR

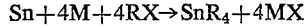

and the formula RO—$CH_2$—$CH_2$—O—$CH_2$—$CH_2$—OR

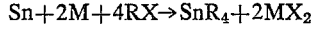

are the preferred ones for the process according to the invention.

Particularly interesting and satisfactory results have been obtained by using tetra-hydrofuran and the diethyl and dimethyl ethers of diethyleneglycol.

The ratio tin/auxiliary metal is determined by the stoichiometry of the process; when magnesium is used as auxiliary metal, it is convenient to operate with a $$Sn:Mg = 1:2$$

molar ratio, although it is also possible to operate with an excess of either Sn or Mg.

The catalysts are fed with the alkyl halide which acts also as a solvent in the system.

When the catalyst is in the liquid state, as in the case of Lewis bases, the volumetric ratio:catalyst/alkylating agent is between about 1:2 and 1:20, but preferably is higher than 1:10.

When the catalyst is in the solid state as in the case of the tetra-alkylammonium salts, it is preferably used in relatively high concentrations in order to attain a higher reaction rate; the concentration must be greater than 10 g./l. compatibly with the solubility of the salt.

In order to obtain a high conversion it is convenient to operate with suspensions having a high solid/liquid ratio, preferably with ratios between about 0.1 and 2 expressed as kilograms of solid/liter of liquid.

The process of this invention shows different advantages with respect to the common methods of preparation of tin-alkyl compounds. The main advantages are represented by the fact that it is possible to use metallic tin instead of a tin halide and that it is not required to preform organometallic compounds which are difficult to manipulate.

The present invention will now be still further illustrated by means of the following detailed working examples:

EXAMPLE 1

Into a flask containing a solution saturated with stannous chloride in acetone are introduced pieces of Mg. The Mg becomes covered with a sponge of Sn which is separated mechanically and washed with EtBr.

The Sn thus obtained is then suspended in EtBr and introduced under a current of nitrogen into a 250 cc. flask fitted with a vane stirrer, a reflux coolant cooled down to −60° C., a thermometer, and an exit pipe for the gases. Into this flask are then added:

Mg in powdery form, with a granulometry between 120 and 325 mesh.
EtBr, having a titration higher than 99%.
Catalyst.

This suspension is maintained under heavy stirring for 7 hours at a constant temperature, under a nitrogen atmosphere. At the end of the reaction the reaction mass is filtered and the solid and liquid residues analysed.

The operational conditions and the corresponding results are listed in the following Table 1. In Tests Nos. 1 and 2 the yields with respect to the converted Sn were determined. In test No. 1 the yield was 98% while in Test No. 2 the yield was 75%.

TABLE 1

| Test No. | Sn, g. | EtBr, cc. | Mg, g. | Catalyst | Amount | Temp., °C. | $SnEt_4$, mg. |
|---|---|---|---|---|---|---|---|
| 1 | 3 | 45 | 1.5 | $Bu_4NI$ | 2 g. | 38 | 330 |
| 2 | 8 | 30 | 2 | $Bu_4NI$ | 2 g. | 38 | 820 |
| 3 | 8 | 30 | 2 | $Pe_4NI$ | 2 g. | 40 | 310 |
| 4 | 3 | 45 | 1.5 | THF | 3 cc. | 40 | 360 |
| 5 | 3 | 45 | 1.5 | THT | 3 cc. | 40 | 430 |
| 6 | 3 | 45 | 1.5 | DEC | 3 cc. | 40 | 230 |
| 7 | 7 | 30 | 1.5 | $Et_3N$ | 6 cc. | 40 | 85 |

NOTE.—$Bu_4NI$=Tetrabutyl-ammonium iodide; $Pe_4NI$=Tetra-pentyl-ammonium iodide; THF= Tetra-hydrofuran; THT=Tetra-hydrothiophene; DEC=Diethyl-carbitol $(EtO—CH_2—CH_2)_2O$; $Et_3N$=Triethylamine.

EXAMPLE 2

A powder suspension of commercial Sn, with a granulometry below 325 mesh, is maintained under stirring in a 6% solution of Br in $CCl_4$, for 6 hours at room temperature. The powder thus obtained is washed by decanting with EtBr.

The Sn thus obtained is suspended in EtBr and then charged into a 250 cc. flask under a nitrogen atmosphere: the flask was provided with a stirrer, a reflux coolant cooled down to −60° C., a thermometer, and an exit pipe for the gases; thereupon are added the Mg powder which had a granulometry between 120 and 325 mesh, the ethyl bromide and the catalyst.

The reaction mass is maintained under heavy stirring under a nitrogen atmosphere for 7 hours and at a constant temperature. At the end of the reaction, the mass is filtered, and the solid and liquid residues analysed.

The operational conditions and the results are listed below in Table 2.

TABLE 2

| Test No. | Sn, g. | EtBr, cc. | Mg, g. | Catalyst | Amount | Temp., °C. | $SnEt_4$, mg. |
|---|---|---|---|---|---|---|---|
| 1 | 2 | 45 | 1.5 | $Bu_4NI$ | 2 g. | 38 | 80 |
| 2 | 7 | 30 | 2 | $Bu_4NBr$ | 5 g. | 38 | 303 |
| 3 | 5 | 40 | 1.5 | DEC | 4 cc. | 40 | 402 |

EXAMPLE 3

A suspension of 5 g. of Sn in 30 cc. of EtBr (obtained according to Example 1) is introduced under a nitrogen atmosphere into the same equipment as in Example 1, together with 5 cc. of tetra-hydrothiophene.

Thereupon are added 3 g. of Na in the form of pellets having a mean diameter of about 0.5 mm. (prepared from Na in pieces in boiling toluene).

The reaction mass is maintained under stirring for 7 hours.

At the conclusion of the reaction, the reaction mixture was found to contain 45 mg. of $SnEt_4$.

What is claimed is:

1. A process for preparing tin-alkyls starting from metallic tin and an alkyl halide comprising reacting a mixture of subdivided tin and an auxiliary subdivided alkali metal or alkaline earth metal and an alkyl halide, in the presence of a catalyst selected from the class consisting of onium salts and Lewis bases or mixtures thereof, at a temperature between about 0° and 150° C.; the alkali metal/tin molar ratio being about 4 and the alkaline earth metal/tin molar ratio being about 2.

2. A process according to claim 1, wherein there is used an alkyl halide RX in which R is an alkyl group having from 1 to 8 carbon atoms and X is a halogen selected from the class consisting of Cl, Br and I.

3. A process according to claim 1, wherein the auxiliary alkaline earth metal is Mg.

4. A process according to claim 1, wherein the onium salt is a tetra-alkylammonium halide.

5. A process according to claim 4, wherein the tetra-alkylammonium halide is tetra-butylammonium iodide or bromide.

6. A process according to claim 1, wherein the Lewis base is selected from the class consisting of ethers, thioethers and amines.

7. A process according to claim 6, wherein the Lewis base is a saturated ether.

8. A process according to claim 6, wherein the Lewis base is tetra-hydrofuran.

9. A process according to claim 6, wherein the ether is diethylether of diethyleneglycol.

10. A process according to claim 1, wherein the subdivided tin is a tin powder which has been activated by pre-washing the powder with a solution of a halogen in an inert solvent.

11. A process according to claim 1, wherein the subdivided tin is a tin powder obtained through cementation with an electropositive metal from a solution of a tin salt in an organic solvent.

References Cited
UNITED STATES PATENTS 3,387,011   6/1968   Coates et al. _____ 260—429.7
3,415,857  12/1968   Hoye et al. _____ 260—429.7

JAMES E. POER, Primary Examiner
W. F. W. BELLAMY, Assistant Examiner